Sept. 4, 1945.     D. KNIES     2,384,179
CONVEYER
Filed Aug. 9, 1944     3 Sheets-Sheet 1

INVENTOR;
DANIEL KNIES,
BY
ATTY.

Sept. 4, 1945.　　　　　D. KNIES　　　　　2,384,179
CONVEYER
Filed Aug. 9, 1944　　　　　3 Sheets-Sheet 2
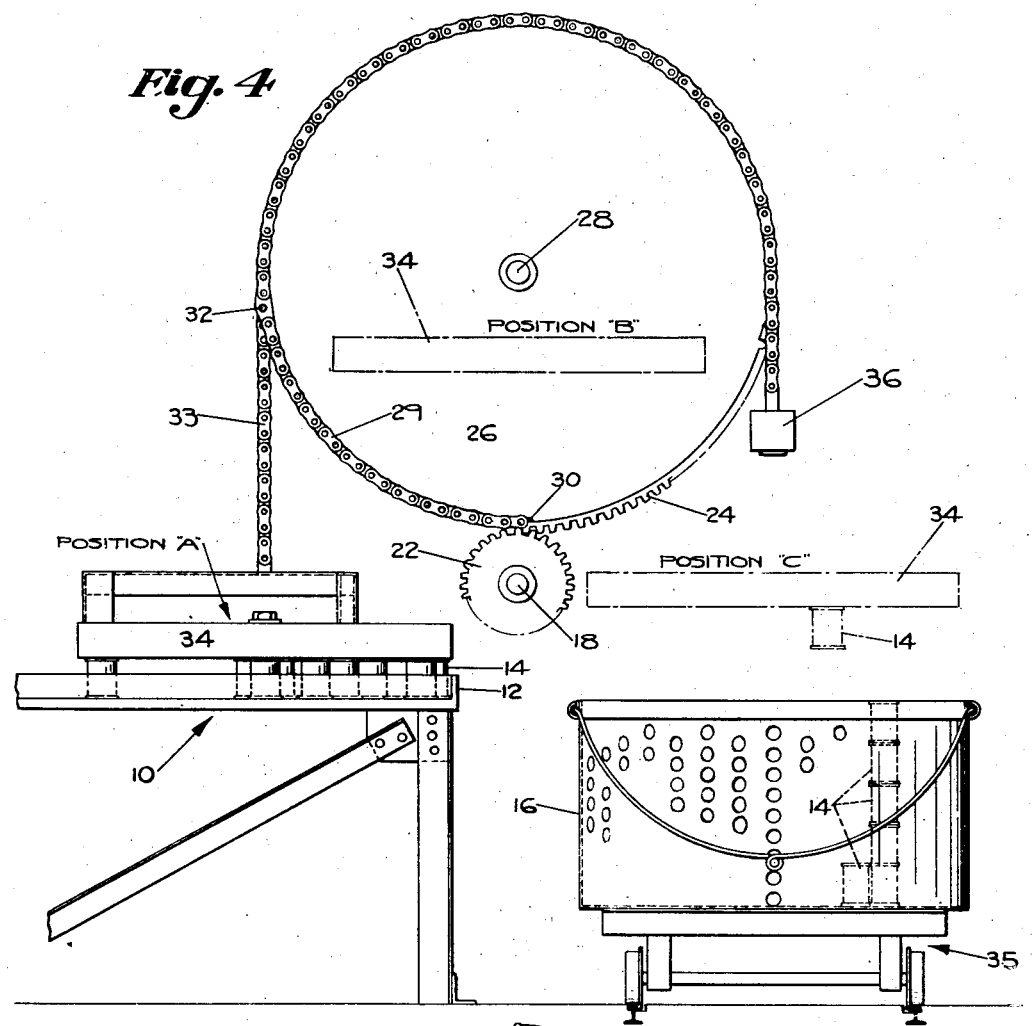
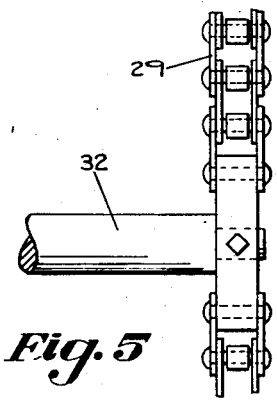
INVENTOR;
DANIEL KNIES,
BY
ATT'Y Sept. 4, 1945.   D. KNIES   2,384,179
CONVEYER
Filed Aug. 9, 1944   3 Sheets-Sheet 3

INVENTOR;
DANIEL KNIES,
BY
*Harker H. Hittson,*
ATTY.

Patented Sept. 4, 1945

2,384,179

UNITED STATES PATENT OFFICE 2,384,179

CONVEYER

Daniel Knies, Bexley, Ohio, assignor to The Jeffrey Manufacturing Company, a corporation of Ohio Application August 9, 1944, Serial No. 548,674

10 Claims. (Cl. 214—1)

This invention relates to a conveyer or transfer device particularly adapted to transfer objects such as cans of soup, vegetables, or objects generally from a discharge or transfer station to a receiving station or receptacle.

An object of the invention is to provide such an apparatus which is of improved character, simplified in construction and one which is designed particularly to effect the final conveying action by lowering the articles to be transferred vertically downwardly to any one of a plurality of desired positions.

Another object of the invention is to provide an improved conveyer or transfer device which is particularly designed to convey metal particles such as so-called tin cans which may be filled with vegetables, fruit or the like, or may be empty and to stack them into a receptacle.

Other objects of the invention will appear hereinafter, the novel features and combinations being set forth in the appended claims.

In the accompanying drawings,

Fig. 4 is an enlarged schematic view in which the frame structure and certain other parts have been eliminated, the view showing the principal functional parts involved in effecting the transfer of material;

Figs. 5 and 6 are enlarged views showing a portion of one of the chain cables and the end of the connecting cross shaft;

This invention is illustrated in its preferred embodiment as being employed to transfer so-called tin cans which are filled with soup, vegetables, fruit or the like, the transfer being effected from a discharge or transfer station to a receptacle, which receptacle is adapted to be delivered to an oven or bath for the processing of the soup, vegetables, or fruit in the cans. It is obvious, however, that in certain broader aspects of the invention it is by no means limited to the solution of this particular problem.

Figure 8:
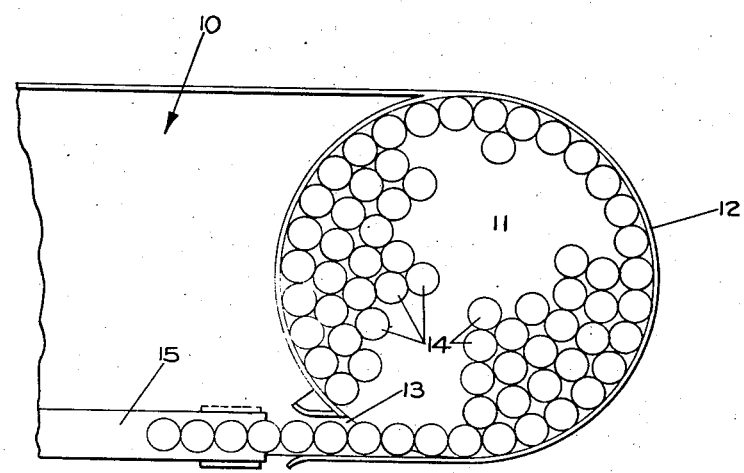
Fig. 8 is somewhat of a diagrammatic plan view of the mechanism for assembling the cans prior to their transfer.

In Fig. 8 of the drawings, there is illustrated conveyer mechanism which is in common use today which gathers a predetermined number of cans of predetermined size and which fill a circle of fixed diameter, this being the exact number of cans required to make up one tier or layer of cans to be delivered to a container or receptacle in which the cans are heat processed. The mechanism of Fig. 8, which is also illustrated in Fig. 4 of the drawings, includes a table 10 which is provided with a rotary plate 11 surrounded by a cylindrical guide wall 12 which has a feed opening 13 into which cans 14 are fed over a portion of the table 10 by means of a belt conveyer 15. As previously stated, this construction is known in the art and it is merely illustrative of one arrangement for gathering a group of cans into a uniform arrangement.

The problem which was solved by this invention, particularly in connection with these cans, was that of transferring the cans 14, which have been assembled in a group as above mentioned at a discharge or transfer station, to any one of a plurality of elevations, layers or tiers at a receiving station or within a receiving receptacle 16 (see Fig. 4) which, for example, may be perforated so that they may be submerged in a tank of hot water to process the food in said cans 14. It is obvious that since the receptacle 16 has sufficient depth to receive a plurality of layers, stacks or tiers 14, which layers are in vertical alignment one above the other, the final delivery of the cans as a group must be by vertically downward travel to any one of a plurality of levels or positions.

In the operation of the device, the cans 14 are assembled on the revolving plate 11 until said revolving plate is completely covered or, in other words, so that each layer of cans as it is ultimately delivered to the receptacle 16 will be filled solid.

Turning now to a consideration of the details of the conveyer or transfer device, it includes a main frame 17 built up of structural members. Mounted in appropriate journal bearings on opposite sides of said main frame is a horizontal drive shaft 18 which is driven from an electric motor 19 through a speed reducing mechanism 20. Near the opposite ends inside the main frame 17 the shaft 18 carries spaced pinion gears 21 and 22 which are keyed to the shaft 18. Gear 21 meshes with and drives a large gear 23 and gear 22 meshes with and drives a large gear 24. Gears 23 and 24 are connected to large sprockets or wheels 25 and 26, respectively, so that said sprocket wheels 25 and 26 are driven by said gears 23 and 24, respectively. Gear 23 and sprocket wheel 25 are mounted on an inwardly extending horizontal stub shaft 27 and gear 24 and sprocket wheel 26 are mounted on an inwardly extending horizontal stub shaft 28. The stub shafts 27 and 28 are mounted upon opposite sides of the main frame 17 and are in alignment with each other on a horizontal axis which is preferably in the same vertical plane as the horizontal axis of the shaft 18. It is obvious that the inner ends of the stub shafts 27 and 28 are spaced apart so that there is no obstruction whatever between them. The importance of this will be pointed out hereinafter.

Attention is now directed particularly to Fig. 4 of the drawings and to an important structure which it is to be understood is duplicated on each side of the sprocket wheels 25 and 26, that in connection with sprocket wheel 26 alone being described. Wrapped about a portion of the periphery of the sprocket wheel 26 is a flexible cable 29 which is illustrated in the form of a link type chain, though other types of cable such as steel cable, rope or the like, may be employed. Of importance is the fact that the chain or cable 29 is attached at one end to wheel 26. For example, it may be welded thereto as illustrated at 30. The cable or chain 29 is wrapped about the wheel 26 and on the right hand side, as viewed in Fig. 4, it hangs entirely free or, in other words, it winds off the wheel 26 and hangs vertically downwardly in a vertical plane tangent to the right hand periphery of said wheel 26. This vertical plane passes through the receptacle 16 and is preferably located substantially on a diameter thereof.

Figure 1:
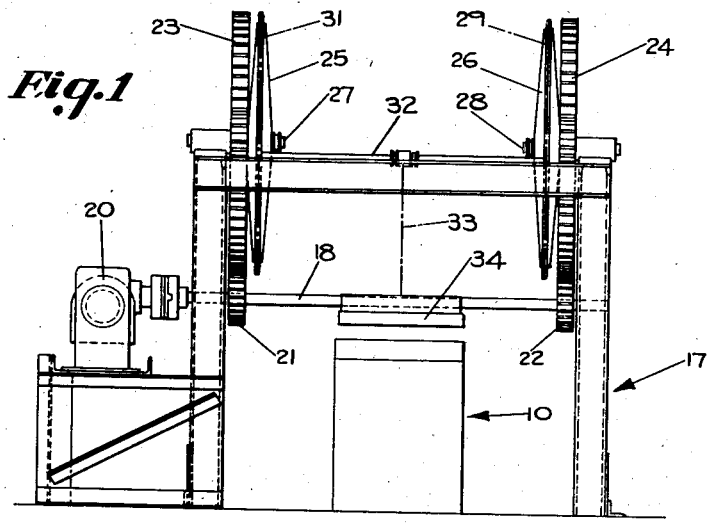
Fig. 1 is a front elevational view of the device of my invention.
Figure 2:
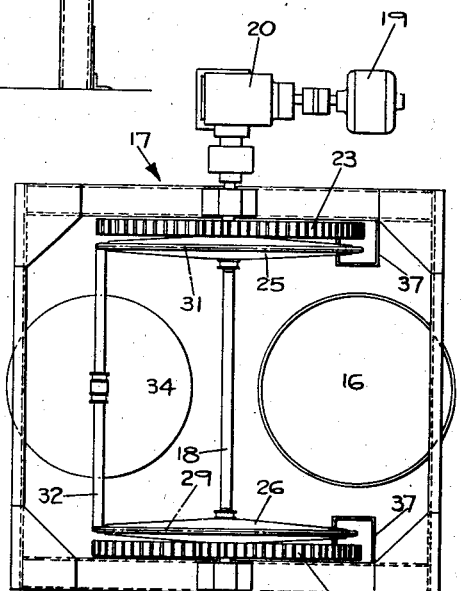
Fig. 2 is a plan view thereof.

Extending between the chain cable 29 and the duplicate thereof, designated 31, which is carried by the wheel 25, is a cross rod 32 (see Figs. 1, 2 and 5). Opposite ends of the cross rod 32 are attached to said chains 29 and 31, as clearly illustrated in connection with chain 29 in Figs. 5 and 6 of the drawings. At the center of the cross rod 32 there is a flexible hanger chain 33 which at its bottom suspends or supports a transfer or carrier member 34 which is preferably in the form of an electro-magnet. The electro-magnet is particularly desirable where so-called tin cans or other metal objects are to be transferred since it constitutes a very desirable means for picking up cans merely by the energization thereof and the releasing of the cans merely by the de-energization thereof. Obviously, in some of its broader aspects, other types of transfer or carrier devices may be employed.

Considering Fig. 4 of the drawings for the moment, certain important characteristics of the device should be observed. First of all it is to be noted that the discharge or transfer position on the table 10 where the cans 14 are assembled in a compact group has its center in a vertical plane which is tangent to each of the wheels 25 and 26 on the left hand side thereof, as viewed in Fig. 4 of the drawings. More specifically, the axis of the lift chain 33, which incidentally could be merely a hang rod and is not necessarily flexible, passes through the center of the revolving plate 11 or, in other words, through the center of the mass of cans which are to be transferred. The axis of this suspension chain is in a vertical plane tangent to the periphery of the wheels 25 and 26 on one side thereof. Receptacle 16 is generally cylindrical in shape and it is so positioned, for example, by being carried on a track mounted truck 35, that its upright axis lies in a vertical plane which is tangent to the wheels 25 and 26 on the other or right hand side thereof, as viewed in Fig. 4 of the drawings.

As best illustrated in Fig. 2 of the drawings, the axes of the transfer station or position at 11 and the receiving position or station as represented by receptacle 16 lie in the same vertical plane which is at right angles to the axis of rotation of the wheels 25 and 26 or, in other words, at right angles to the axis of stub shafts 27 and 28. The importance of these various relations of parts as well as others specifically mentioned will be understood from a consideration of the operation of the apparatus.

First of all, the receiving revolving plate 11 will be fed with cans 14 until the enclosure defined by the guide walls 12 is completely full. The device will be operated by controlling the motor 19 so that the electro-magnet 34 is resting on top of said group of cans. Magnet 34 is then energized either by automatic or manual control and thus seizes each of the cans 14. Motor 19 is then operated and wheels 25 and 26 are rotated in a clockwise direction, as viewed in Fig. 4. During this operation the path of the magnet 34 will be parallel to the path of travel of the cross rod 32 which, of course, will be through an arc of a circle having the same diameter as the diameters of the wheels 25 and 26. In other words, during the first part of this travel the magnet 34 and cans 14 will move substantially upward. This will be followed by a combination upward and lateral movement through an arc of a circle until the magnet 34 reaches the position designated B in Fig. 4 of the drawings. Continued rotation of the wheels 25 and 26 will produce continued lateral and downward movement of the magnet 34 and cans 14 until the suspended chain 33 reaches the position substantially tangent to the right hand side of each of said wheels 25 and 26. Obviously, due to gravity, the suspension chain 33 will always hang vertically. This is the position which will be reached by the magnet 34 and designated position C. Thereafter as wheels 25 and 26 continue to rotate in a clockwise direction the movement of the magnet 34 and cans 14 will be vertically downward and this downward movement will be continued by rotation of said wheels 25 and 26 until the cans 14 and, of course, the magnet 34 have reached any one of the desired vertical positions at any one of the desired heights or levels.

Figure 3:
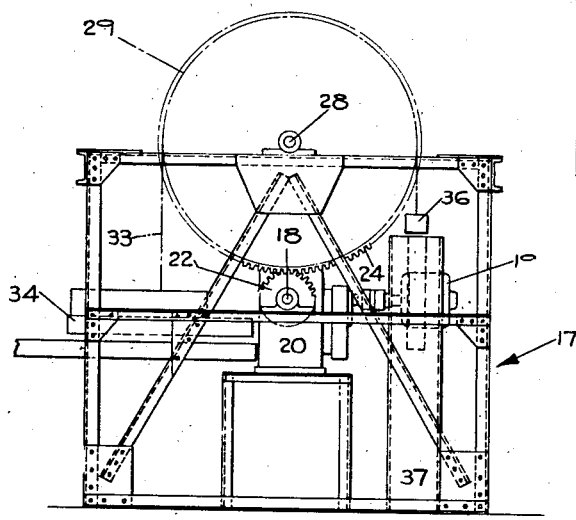
Fig. 3 is a side view of the device.
Figure 7:
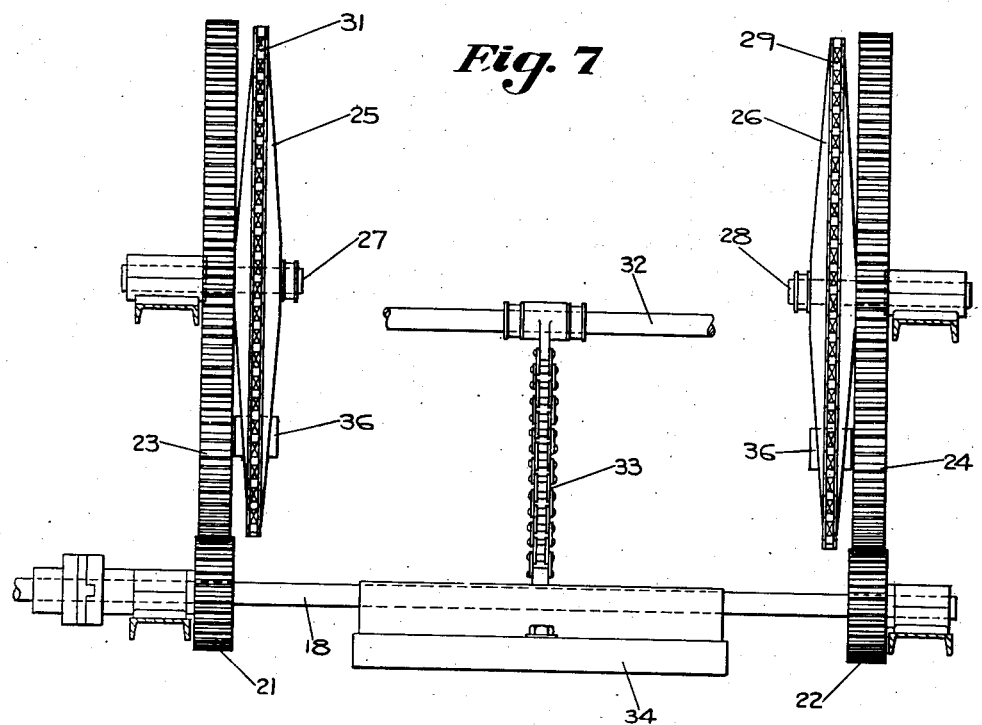
Fig. 7 is an enlarged detailed view showing particularly the structure of the wheels and drive mechanism therefor.

As illustrated in the drawings, there are five layers of cans 14 and in such a receptacle as illustrated at 16 there will be five such discharge positions at which the cans 14 are released either automatically or manually by de-energizing the magnet 34. It is important to note particularly the structure which provides for this vertically downward movement along a single path or, in other words, to any one of a plurality or superposed aligned positions. First of all, to provide this arrangement it is necessary that the cables or chains 29 and 31 be free on the discharge side of the wheels 25 and 26 so that they can leave the wheels 25 and 26 or, in other words, so that the free ends thereof can move upwardly and downwardly along vertical paths. In order to insure proper meshing of the links of chains 29 and 31 with the teeth of the sprocket wheels 25 and 26, each of said chains 29 and 31 carries a counterweight on its free end, that for chain 29 being seen at 36, particularly in Fig. 4 of the drawings. It may also be mentioned that guides or housings may be provided for these counterweights, as illustrated at 37 in Figs. 2 and 3 of the drawings.

In the absence of that portion of the chain 29 illustrated in Fig. 4 of the drawings between cross rod 32 and the weld or attachment between the chain 29 and the sprocket wheel 26 it would only be possible to transfer the magnet 34 from the full line position illustrated in Fig. 4 to the position C. The amount of vertical drop which is desired below the position C of magnet 34 determines the length of cable or chain 31 which is required between the point 32 and the point to which it is to be anchored to the wheel 26. It is to be understood, of course, that a similar restriction applies to the cable or chain 31. For example, if it is desired to lower the magnet 34 two feet vertically from the position C, which can be considered as the position where the vertical axis of the magnet 34 is first in the vertical plane tangent with the wheels 25 and 26, it is necessary to add two feet to chains 29 and 31 measured from the point indicated at 32 or, in other words, the place where the cross bar 32 is attached to said chains, the distance then being measured to the point of anchorage of said chains 29 and 31 to the associated wheels 25 and 26. As a consequence of this additional chain or cable which is wrapped about the wheels 25 and 26 beyond the points or connections 32 in counter-clockwise direction, as viewed in Fig. 4, as wheels 25 and 26 continue to rotate after the magnet 34 is in the position C, it is evident that the cross bar 32 will move vertically downward in a vertical plane tangent to the peripheries of wheels 25 and 26 on the right hand side, since the chains 29 and 31 are free to unwrap themselves from the sprockets 25 and 26 and do so because of the action of gravity on the free ends thereof and their associated counterweights 36. As a consequence, the cans 14 are lowered by rectilinear motion to any desired level or elevation in the receptacle 16 and discharged by de-energization of electro-magnet 34. With the cans 14 thus tranferred from the loading or transfer position at 11 to the receiving position within the receptacle or container 16, the motor 19 is reversed and the wheels 25 and 26 rotated in a counter-clockwise direction, as viewed in Fig. 4 of the drawings. The magnet 34 will reverse its path of travel and pick up another group of associated cans 14 to repeat the operation ultimately to discharge each group of cans on top of all subsequent groups in the container 16 until the container 16 is filled to the top, whereupon a new container will be run into position and the operation carried on continuously.

It is also significant to note that as the magnet 34 moves from its loading position to its discharge position and vice versa it is able in effect to jump over the drive shaft 18 and to carry the cans 14 thereover. This is possible by virtue of the arcuate path of travel taken by the magnet 34 and cans 14 which starts out with practically a pure vertical movement, is followed by a lateral movement having a vertically upward component, then by lateral movement having a vertically downward component and finally by a pure vertical downward movement.

The provision of the stub shafts 27 and 28 provides for the free lateral movement of the hanger chain 33 to opposite sides of the axis of said stub shafts 27 and 28. In other words, there is a free path between the wheels 25 and 26 to opposite sides of the axis of rotation thereof.

While in the drawings I have illustrated the magnet 34 as being the preferred form of transfer or carrier member, it is obvious that other types might be employed. For example, a basket may be provided which is merely hooked to the hanger chain 33 and unhooked when it is delivered to the receptacle 16. Other well known types of carrier members may also be substituted in certain broader aspects of my invention.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A transfer or conveyer mechanism for transferring a group of articles from one position to another position horizontally removed therefrom and at a different and variable elevation including means for supporting a group of articles, a flexible chain cable, a rotary wheel about which said cable is wrapped and attached, a suspension member connected to said cable intermediate its ends and suspending said supporting means, and means for rotating said wheel whereby said supporting means is lifted from said one position and transferred to the other and lowered by straight line movement an amount which may be varied after the full lateral transfer thereof has been effected by rotation of said wheel.

2. A transfer or conveyer mechanism for transferring a group of articles from one position to another position horizontally removed therefrom and at a different and variable elevation including means for supporting a group of articles, a flexible cable, a rotary wheel about which said cable is wrapped and attached, a suspension member connected to said cable intermediate its ends and suspending said supporting means, and means for rotating said wheel whereby said supporting means is lifted from said one position and transferred to the other and lowered by straight line movement an amount which may be varied after the full lateral transfer thereof has been effected by rotation of said wheel.

3. A transfer device including a receiving station and a discharge station, a wheel mounted on a horizontal axis with its periphery on one side lying in a vertical plane above said receiving station and its periphery on the opposite side lying in a vertical plane above said discharge station, a flexible cable wrapped at least part way around said wheel and attached thereto at one end with the other end free of said wheel whereby said free end can move vertically upwardly and downwardly as said wheel rotates, and material supporting means attached to said cable intermediate its ends and hanging therefrom.

4. A transfer device including a wheel, a flexible chain cable wrapped about said wheel, means attaching one end of said cable to said wheel, the other end being free to move upwardly and downwardly, and material supporting means attached to said cable intermediate its ends.

5. A transfer device including a wheel, a flexible cable wrapped about said wheel, means attaching one end of said cable to said wheel, the other end being free to move upwardly and downwardly, and material supporting means attached to said cable intermediate its ends.

6. A conveyor mechanism adapted to lift a group of cans upwardly from a transfer station and then transfer them laterally and finally to lower them vertically to variable levels at a receiving station, said mechanism including wheel means mounted for rotation on a horizontal axis, the periphery of said wheel means on one side being in a vertical plane passing through said transfer station and the periphery on the other side being in a vertical plane passing through said receiving station, flexible cable means wrapped about said wheel means and attached thereto at one end while the other end is free to wind off said wheel means, means for supporting said articles including means suspending it from said cable means intermediate the ends thereof, and means for oscillating said wheel means to effect the above described transfer, the path of said cans from said transfer station to said receiving station being first upwardly substantially vertically, then laterally and vertically together, the vertical component being first upward and then downward, and finally vertically downward a distance which may be varied by the amount of rotary movement of said wheel means.

7. A conveyer mechanism adapted to lift material upwardly from a transfer station and then transfer it laterally and finally to lower it vertically to variable levels at a receiving station, said mechanism including wheel means mounted for rotation on a horizontal axis, the periphery of said wheel means on one side being in a vertical plane passing through said transfer station and the periphery on the other side being in a vertical plane passing through said receiving station, flexible cable means wrapped about said wheel means and attached thereto at one end while the other end is free to wind off said wheel means, means for supporting said material including means suspending it from said cable means intermediate the ends thereof, and means for oscillating said wheel means to effect the above described transfer, the path of said material from said transfer station to said receiving station being first upwardly substantially vertically, then laterally and vertically together, the vertical component being first upward and then downward, and finally vertically downward a distance which may be varied by the amount of rotary movement of said wheel means.

8. A conveyer for conveying metal devices including a wheel, a cable wrapped about said wheel and attached thereto at one end while the other end is free, a magnet adapted when energized to suspend said metal devices, and means suspending said magnet from said cable at a point intermediate its ends.

9. A transfer conveyer including a frame, a horizontal shaft mounted to rotate on said frame, motor means for rotating said shaft, a pair of laterally spaced wheels mounted on stub axles located above said shaft, means driving both of said wheels from said shaft, a flexible chain cable mounted on each wheel and attached thereto at one end while the other end freely drops vertically downwardly from one side of the associated wheel, a cross rod attached at opposite ends to said cables at positions intermediate the ends thereof, a material support including an electro-magnet suspended from said cross rod, said conveyor operating in response to rotation of said wheels through less than a whole revolution first to lift said material support upwardly, then by a combined vertical and lateral movement to swing it between said two wheels and over said horizontal shaft, then lower it finally by vertically downward movement only to any one of a plurality of vertically aligned positions at different heights and into a receptacle.

10. A transfer conveyer including a frame, a horizontal shaft mounted to rotate on said frame, motor means for rotating said shaft, a pair of laterally spaced wheels mounted on stub axles located above said shaft, means driving both said wheels from said shaft, a flexible cable mounted on each wheel and attached thereto at one end while the other end freely drops vertically downwardly from one side of the associated wheel, a cross rod attached at opposite ends to said cables at positions intermediate the ends thereof, a material support suspended from said cross rod, said conveyer operating in response to rotation of said wheels through less than a whole revolution first to lift said material support upwardly, then by a combined vertical and lateral movement to swing it between said two wheels and over said horizontal shaft, then lower it finally by vertically downward movement only to any one of a plurality of vertically aligned positions at different heights.

DANIEL KNIES.